US005176393A

United States Patent [19]

Robertson et al.

[11] Patent Number: 5,176,393

[45] Date of Patent: Jan. 5, 1993

[54] MODULAR WHEELCHAIR

[75] Inventors: A. Scott Robertson, Pasadena; Richard Geiger, Fremont; Robert W. Lishman, LaSelva Beach, all of Calif.

[73] Assignee: Medical Composite Technology, Soquel, Calif.

[21] Appl. No.: 516,048

[22] Filed: Apr. 27, 1990

[51] Int. Cl.[5] .............................................. B62M 1/14

[52] U.S. Cl. ................................ 280/250.1; 280/650; 180/907; 297/DIG. 4

[58] Field of Search ................ 180/214, 907; 188/2 F; 297/354, DIG. 4; 280/250.1, 304.1, 242.1, 647, 650

[56] References Cited

U.S. PATENT DOCUMENTS

| | | | |
|---|---|---|---|
| R. 32,242 | 9/1986 | Minnebraker | 280/242 WC |
| D. 254,970 | 5/1980 | Honzyou | D12/131 |
| D. 278,217 | 4/1985 | Nassiri | D12/131 |

(List continued on next page.)

FOREIGN PATENT DOCUMENTS

| | | | |
|---|---|---|---|
| 501986 | 5/1954 | Canada . | |
| 0312969 | 4/1989 | European Pat. Off. | 280/250.1 |
| 2532485 | 2/1977 | Fed. Rep. of Germany | 188/2 F |
| 883578 | 7/1943 | France . | |
| 451392 | 8/1936 | United Kingdom . | |
| 939012 | 10/1963 | United Kingdom . | |

*Primary Examiner*—Mitchell J. Hill
*Assistant Examiner*—Paul Dickson
*Attorney, Agent, or Firm*—Burns, Doane, Swecker & Mathis

[57] ABSTRACT

A modular wheelchair that may be rapidly assembled and disassembled includes an adjustable chassis for releasably attaching a wheel module and a seating module having a detachable leg rest module. The one-piece chassis is constructed from composite materials and has hollow or foam filled longitudinal sides and cross-bars connecting the sides, and two cantilevered or trussed forwardly extending arms which connect swivel castors. The sides include mounts for adjustably attaching the seat module at a selectable center of gravity and height. The composite materials of the arms provide shock and vibration protection and further provide a space behind the arms and beneath the seating assembly for storing and attaching optional equipment. The wheel assembly includes drive wheels constructed from composite materials, smaller travel wheels for traversing narrow openings, anti-tip wheels and wheel locks. the wheels may be composite or tensioned disk wheels that may be locked by wheel locks having a spring device for automatically opening or closing the lock. The wheels are removably attached within lateral recesses in the chassis sides by interchangeable wheel axle alignment plugs which receive the wheel axle and plug into the recesses. The interchangeable plugs define a variety of angled axle chambers to provide for preselection of camber angles for the wheel. The seating assembly includes a frame having two longitudinal side members and at least one cross-member secured to the sides at the front and rear of the frame, side rails for adjustably mounting to the mounts on the chassis, and a seat with a forwardly pivoting back rest. A leg rest module including a foot rest is adjustably mounted to the seating module and includes a leg rest clamping mechanism for clamping the leg rest at a fixed angular orientation relative to the frame. The leg rest may be rotated substantially 90 degrees in front of the wheelchair and substantially 90 degrees to a retraction position beneath the seat. The leg rest includes independently adjustable right and left foot rest plates to enable the length of each leg to be independently accommodated, and for independently adjusting the user's ankle angle. The leg rest may be removed for double amputees.

11 Claims, 10 Drawing Sheets

U.S. PATENT DOCUMENTS

| | | | |
|---|---|---|---|
| D. 294,476 | 3/1988 | Michel et al. | D12/133 |
| D. 300,733 | 4/1989 | Wagner | D12/131 |
| D. 304,815 | 11/1989 | Jones | D12/133 |
| D. 305,318 | 1/1990 | Danecker | D12/131 |
| 774,042 | 11/1904 | Cooper . | |
| 1,620,675 | 3/1927 | Herold . | |
| 1,851,843 | 12/1928 | Inman . | |
| 2,010,306 | 8/1935 | Leech | 155/94 |
| 2,022,348 | 11/1935 | Hoerle | 208/181 |
| 2,797,738 | 7/1957 | Patterson | 155/88 |
| 2,859,837 | 11/1958 | Mize | 188/2 |
| 3,189,385 | 6/1965 | Mommsen | 297/429 |
| 3,243,194 | 3/1966 | Trusock | 280/43.12 |
| 3,337,261 | 8/1967 | Nihlean et al. | 297/44 |
| 3,416,837 | 12/1968 | Saunders | 297/195 |
| 3,486,727 | 12/1969 | Timms | 248/397 |
| 3,794,380 | 2/1974 | Mertz | 297/354 |
| 3,882,949 | 5/1975 | Anderson | 180/8 A |
| 3,937,490 | 2/1976 | Nasr | 280/242 WC |
| 4,082,348 | 4/1978 | Haury | 297/45 |
| 4,101,143 | 7/1978 | Sieber | 280/42 |
| 4,166,631 | 9/1979 | Sanaski | 280/242 WC |
| 4,169,626 | 10/1979 | Hollar, Jr. | 297/365 |
| 4,243,339 | 1/1981 | Dickerson | 403/4 |
| 4,350,227 | 9/1982 | Knoche | 188/2 F |
| 4,351,540 | 9/1982 | Minnebraker | 280/242 WC |
| 4,360,213 | 11/1982 | Rudwick et al. | 280/242 WC |
| 4,371,183 | 1/1983 | Dion | 280/42 |
| 4,380,343 | 4/1983 | Lovell et al. | 280/242 WC |
| 4,392,690 | 7/1983 | Anderson | 301/121 |
| 4,405,142 | 9/1983 | Whetstine | 280/242 WC |
| 4,421,336 | 12/1983 | Petrofsky et al. | 280/250.1 |
| 4,422,660 | 12/1983 | Costello et al. | 280/242 WC |
| 4,428,594 | 1/1984 | Minnebraker | 280/242 WC |
| 4,477,098 | 10/1984 | Minnebraker | 280/242 WC |
| 4,477,117 | 10/1984 | Higgs | 297/45 |
| 4,483,653 | 11/1984 | Waite | 414/541 |
| 4,486,048 | 12/1984 | Meyer | 297/433 |
| 4,489,955 | 12/1984 | Hamilton | 280/242 WC |
| 4,500,102 | 2/1985 | Haury et al. | 280/242 WC |
| 4,500,112 | 2/1985 | Raidel | 280/693 |
| 4,506,901 | 3/1985 | Tosti | 280/242 WC |
| 4,570,756 | 2/1986 | Minnebraker et al. | 188/2 F |
| 4,572,756 | 2/1986 | Minnebraker | 297/429 |
| 4,589,525 | 5/1986 | Phipps et al. | 188/2 F |
| 4,592,570 | 6/1986 | Nassiri | 280/650 |
| 4,593,929 | 6/1986 | Williams | 280/650 |
| 4,595,212 | 6/1986 | Haury et al. | 280/242 WC |
| 4,598,921 | 7/1986 | Fenwick | 280/242 WC |
| 4,607,860 | 8/1986 | Vogel | 280/650 |
| 4,648,619 | 3/1987 | Jungell et al. | 280/650 |
| 4,664,441 | 5/1987 | Collins | 297/183 |
| 4,676,519 | 6/1987 | Meier | 280/242 WC |
| 4,679,816 | 7/1987 | Riikonen | 280/650 |
| 4,693,490 | 9/1987 | Loodberg et al. | 280/650 |
| 4,721,321 | 1/1988 | Haury et al. | 280/242 WC |
| 4,730,842 | 3/1988 | Summers et al. | 280/638 |
| 4,744,585 | 5/1988 | Huang | 280/646 |
| 4,749,064 | 6/1988 | Jinno et al. | 188/2 F |
| 4,754,987 | 7/1988 | Williams | 280/289 WC |
| 4,768,797 | 9/1988 | Friedrich | 280/242 WC |
| 4,770,432 | 9/1988 | Wagner | 280/242 WC |
| 4,805,711 | 2/1989 | Lautzenhiser | 280/304.1 X |
| 4,805,925 | 2/1989 | Haury et al. | 280/250.1 |
| 4,813,693 | 3/1989 | Lockard et al. | 280/42 |
| 4,840,390 | 6/1989 | Lockard et al. | 280/250.1 |
| 4,852,899 | 8/1989 | Kueschall | 280/250.1 |
| 4,863,771 | 9/1989 | Freeman | 428/36.1 |
| 4,887,826 | 12/1989 | Kantner | 280/250.1 |
| 4,887,830 | 12/1989 | Fought et al. | 280/304.1 |
| 4,889,355 | 12/1989 | Trimble | 280/281.1 |
| 4,891,176 | 2/1990 | Drysdale et al. | 264/250 |
| 4,917,395 | 4/1990 | Gabriele | 280/250.1 |
| 4,921,271 | 5/1990 | Berry et al. | 280/661 |
| 5,020,816 | 6/1991 | Mullholland | 280/250.1 |

Fig. 3
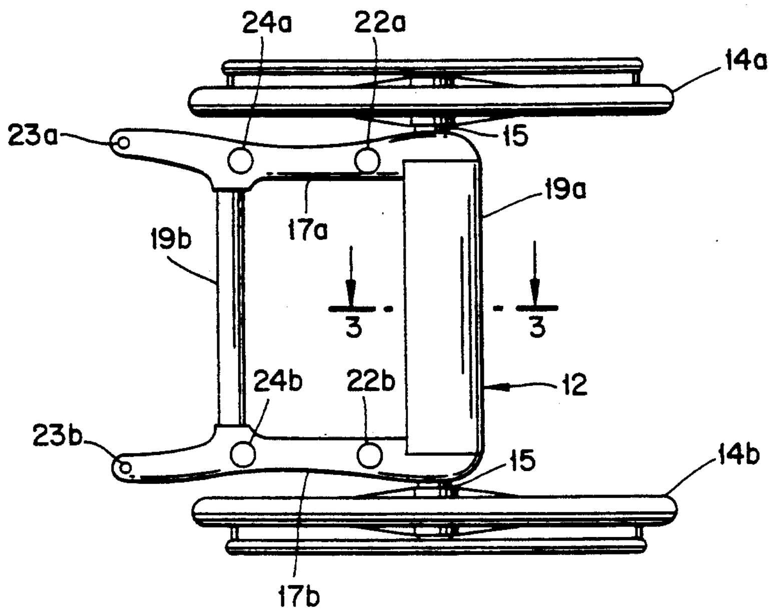
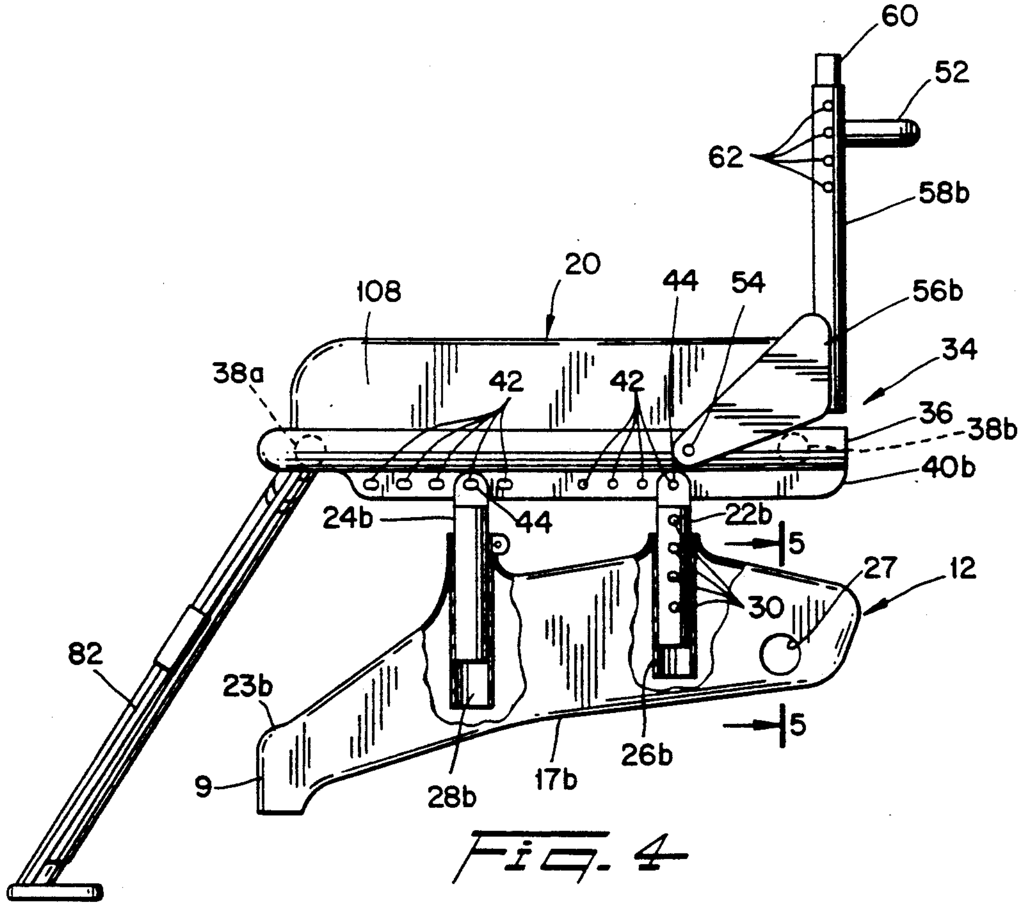
Fig. 4

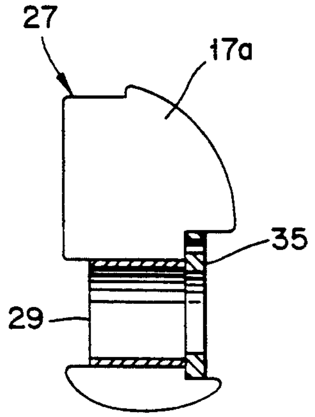
Fig. 5a
Fig. 6a
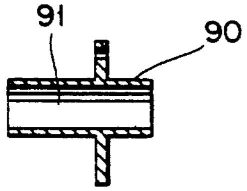
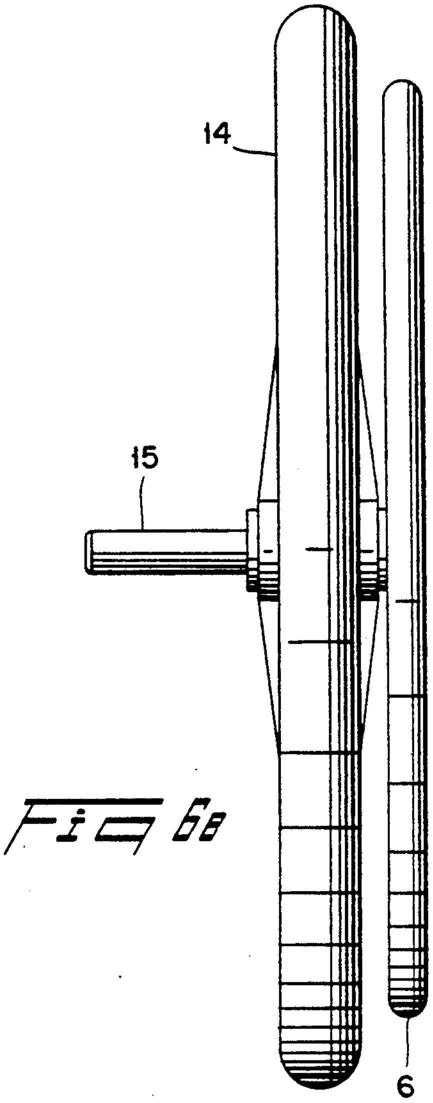
Fig 6e
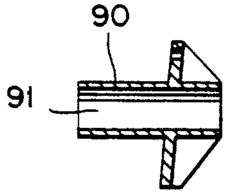
Fig. 6b
Fig. 5b
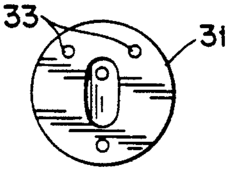
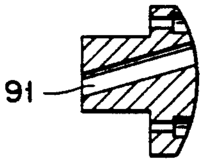
Fig. 6d
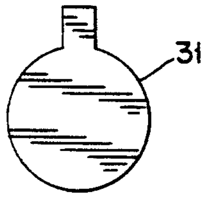
Fig. 5c
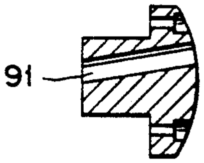
Fig. 6c

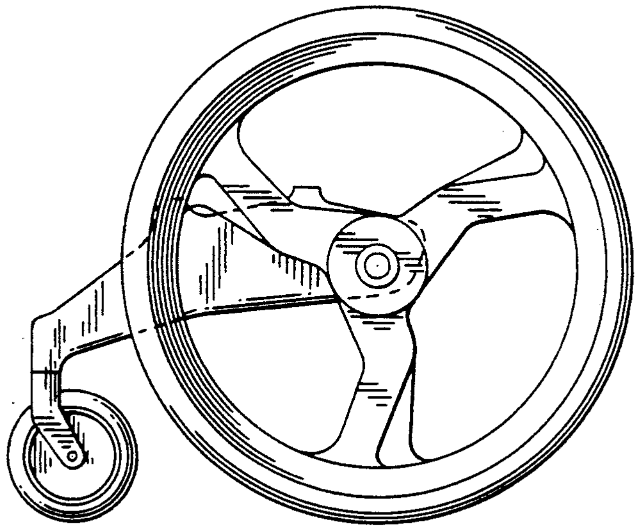
Fig. 7
Fig. 8
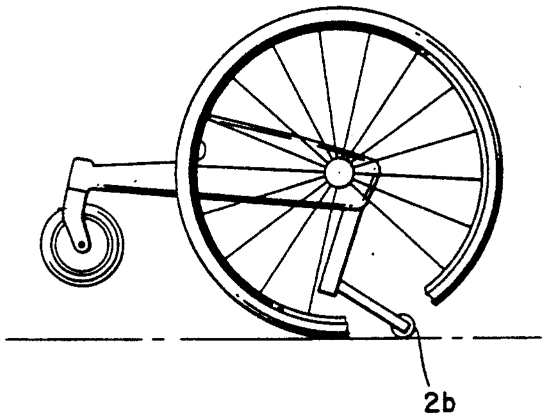
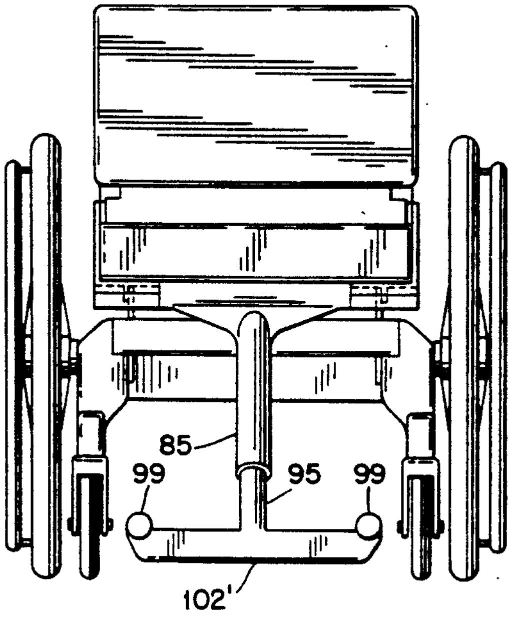
Fig. 9

Fig. 10
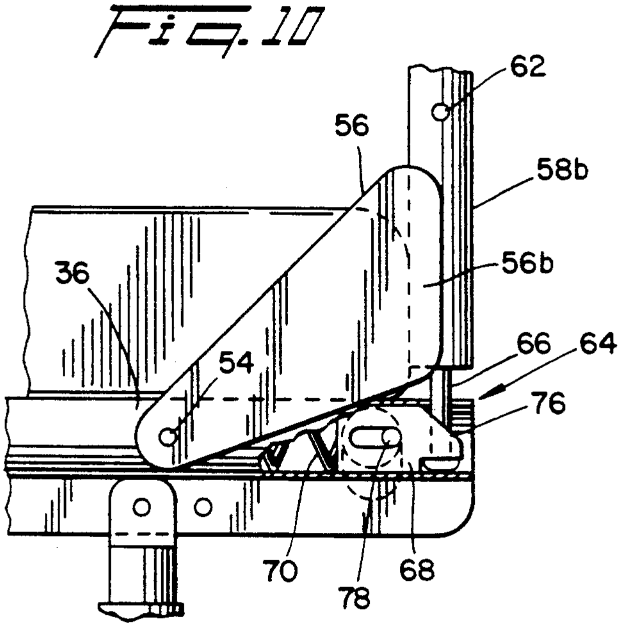
Fig. 11
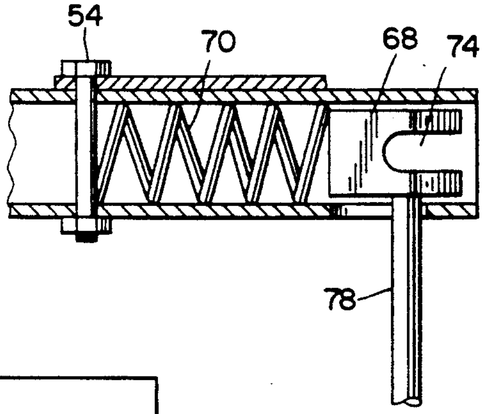
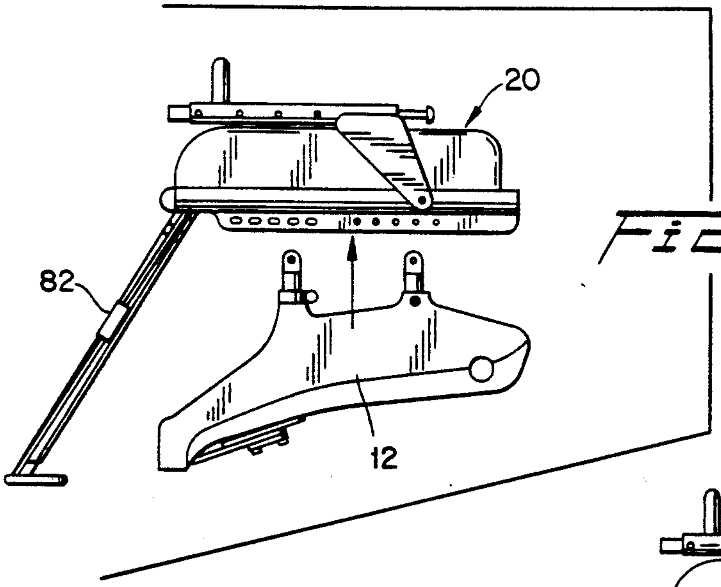
Fig. 12
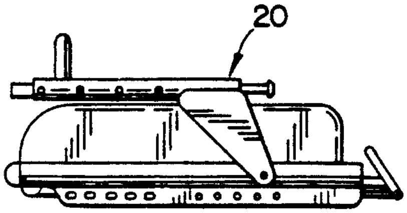
Fig. 13

Fig. 19
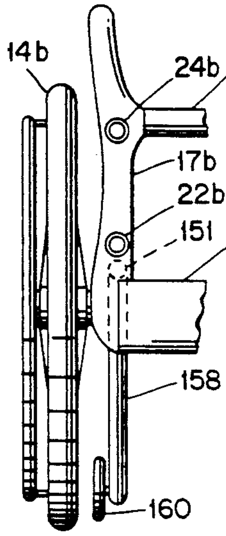
Fig. 18
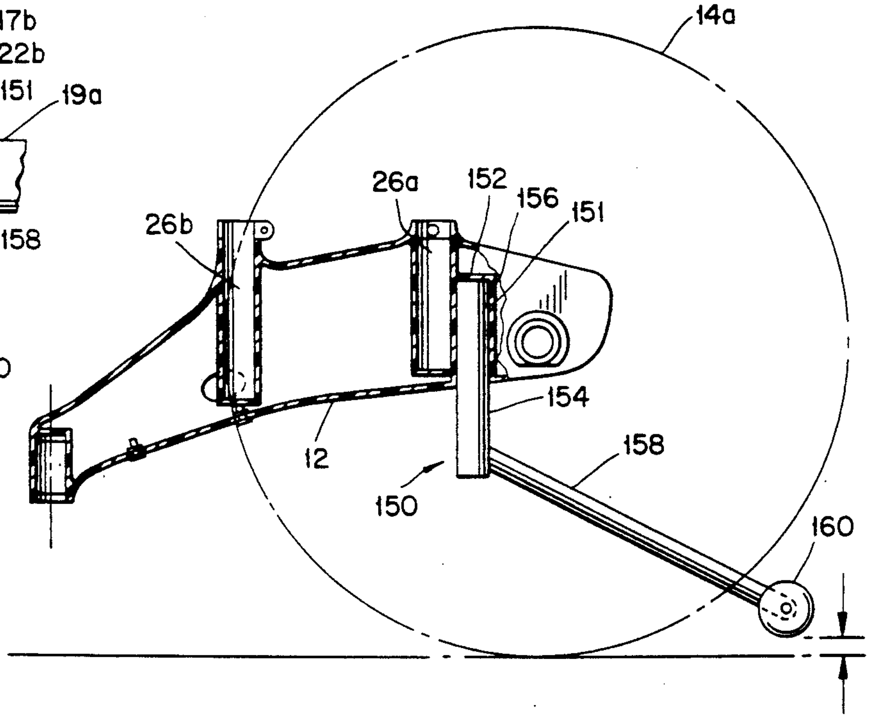
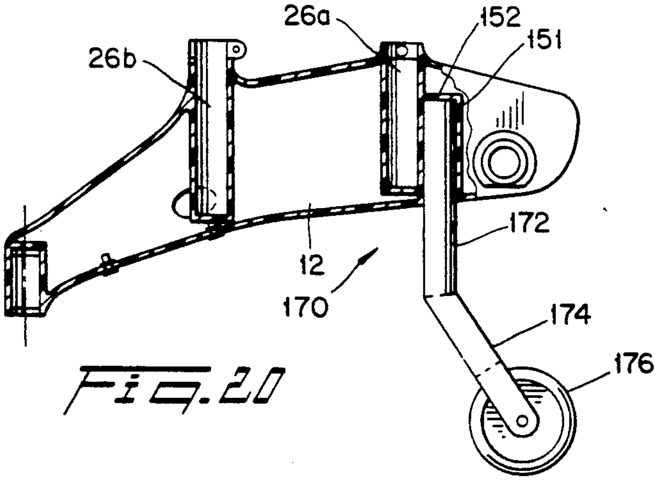
Fig. 20
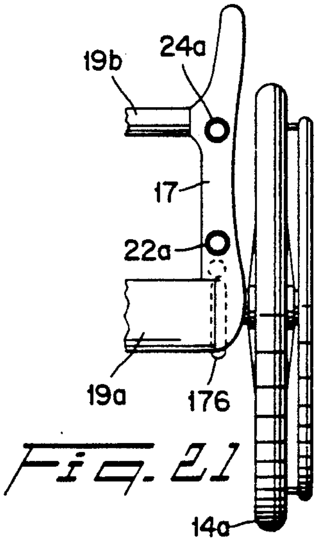
Fig. 21

MODULAR WHEELCHAIR

FIELD OF THE INVENTION

The present invention relates to wheelchairs. More specifically, the present invention relates to a combination of a light-weight, vibration dampening chassis, wheel assembly, seating assembly and leg rest assembly for forming a wheelchair having easily detachable modules.

BACKGROUND OF THE INVENTION

Wheelchairs are well known transportation appliances enabling the infirm, disabled and unwell person to move about with greater mobility than otherwise. Essentially, wheelchairs are small, single person conveyances typified by a chair supported by two outer, large diameter drive wheels, and with two smaller pilot wheels or caster wheels located in front of the user's center of gravity. The chair may include a padded seat, or it may include a webbing or sling seat. Alternatively, the chair may be molded from a suitable material. A chair back is typically provided for the user's comfort. A leg rest assembly may be attached to the seat. Motive power may be supplied by an attendant pushing the wheelchair, by the user's hands and arms, or by an auxiliary power source.

While wheelchairs following many different designs have proliferated, there have been drawbacks heretofore that remain to be solved. In order to meet the needs and demands of the physically handicapped user, wheelchairs must be versatile and easily and readily adapted to accommodate the particular body shape and size of the user. Wheelchairs must also be versatile in adapting to both ambulatory and recreational travel, and they must be sufficiently rugged and durable to provide comfortable passage over uneven and irregular surfaces.

For instance, wheelchair design has not solved the need for shock and vibration dampening control to provide extended opportunities and mobility to the user.

A hitherto unsolved need has arisen for a lightweight adjustable wheelchair, wherein the chassis is made from materials which inherently provide vibration and shock dampening. Another unsolved need has been for a universal, adjustable chassis and wheel assembly. Yet another unsolved need has been to provide a more fully collapsible, modular wheelchair whereby the wheelchair may be easily disassembled and stowed in pieces in small spaces, such as in an overhead storage compartment of an airplane.

A further unsolved need has arisen for a chassis and wheel assembly permitting wheelchair adjustments within a plurality of dimensions and ranges. Still one more unsolved need has been for a modular wheelchair which may be customized to the needs of a particular patient by a therapist with simple adjustments without special skills, tools or training. In addition, an unsolved need has been for a more universal chassis and wheel assembly in which a variety of seating system designs may be readily used without impairment.

SUMMARY OF THE INVENTION WITH OBJECTS

A general object of the invention is to provide a modular wheelchair that overcomes the limitations and drawbacks of the prior art.

A specific object of the invention is to provide an ultra-light modular wheelchair that is fully adjustable.

A further object of the invention is to provide a modular wheelchair wherein the modules forming the wheelchair are easily assembled and disassembled, the modular wheelchair being easily taken apart into a chassis module, a seating module, and a wheel assembly for storage in the overhead compartment of an airplane, or in other weight and volume limited spaces.

Another specific object of the present invention is to provide a modular wheelchair wherein the chassis has cantilevered or trussed arms constructed from materials which inherently provide vibration and shock dampening, the cantilevered or trussed arms creating a space beneath the wheelchair seat for the storage of optional equipment, such as power packs or storage bags.

A more specific object of the present invention is to provide a modular wheelchair which enables easily made, ready adjustments of the chassis, the wheel assembly, the seating assembly and the leg rest assembly within a plurality of dimensions and ranges, independently of each other.

An additional object of the present invention is to provide an attractive wheelchair to increase the well-being of the user, the modular wheelchair enabling a variety of interchangeable seating designs to be selected for particular uses.

Yet another object of the present invention is to provide a modular wheelchair having a chassis constructed from composite materials.

Yet one more object of the present invention is to provide a modular wheelchair having drive wheels defining a variety of spoke patterns and constructed from composite materials, the camber adjustment of the drive wheels providing automatic pivot angle compensation.

Still another object of the present invention is to provide a modular wheelchair having tensioned disk wheels laced with materials such as Kevlar (tm), dacron or nylon, the high tensile strength, corrosion resistant tensioned wheels providing shock and vibration dampening.

One further object of the present invention is to provide a modular wheelchair wherein the wheel assembly further includes smaller travel wheels, anti-tip wheels and tensioned, bi-stable wheel locks, the wheel locks locking in both the open and closed positions and retracting so that the user's thumbs are prevented from hitting the locks during operation of the drive wheels.

In accordance with one aspect of the present invention, a chassis is provided for attaching a wheel assembly and a seating assembly having a detachable leg rest assembly. The one-piece chassis is constructed from composite materials and has two longitudinal hollow or foam filled sides, one or more hollow or foam filled cross-bars transversely connecting the hollow or foam filled sides, and two trussed or cantilevered and forwardly extending arms which connect the castors. The sides include upwardly extending and telescoping posts for adjustably attaching the seat assembly at a selectable center of gravity, seat pan angle and height; and, lateral recesses for detachably and adjustably attaching the wheel assembly. The trussed or cantilevered arms further extend downwardly and the composite material construction provides shock and vibration protection for the wheelchair. The trussed or cantilevered arms further provide a space behind and between the arms and beneath the seating assembly for storing and attaching optional wheelchair equipment, such as storage bags or drive motors and batteries which may be attached within a generally C-shaped, hollow rear cross-bar.

The wheel assembly includes wire spoked wheels, or tensioned disk drive wheels or drive wheels constructed from composite materials with or without metal rims and hubs, smaller travel wheels for traversing narrow openings, anti-tip wheels and tensioned, bi-stable wheel locks. The open and the closed position of the wheel locks is secured and the locks retract so that the user's thumbs will not become caught between the locks and the wheel during manual operation of the drive wheels. The drive wheels may be provided with conventional wire spoke patterns, or with patterns of approximately three to five broader composite spokes, or with a variety of laced patterns for the tensioned disk wheels. The wheels are removably attached to the recesses of the chassis by interchangeable wheel axle alignment plugs which are formed to receive the wheel axle and to plug into the lateral recesses of the chassis. The interchangeable plugs define a variety of angled axle chambers to provide for pre-selection of camber angles for the wheel. The camber plugs are aligned so as to automatically compensate for the castor pivot angle to prevent a self-steering tendency by the castors.

The seating assembly includes a frame having two longitudinal side members and two cross-members secured to the sides at the front and rear of the frame. The frame includes side rails for adjustably mounting to the posts on the chassis. The combination of the adjustable side rails on the seating frame and the adjustable posts on the chassis enables the height, the seat pan angle, and the center of gravity of the seat as occupied by the user to be adjusted. A seat and a forwardly pivoting back rest are also removably mounted to the frame. A leg rest including a foot rest is adjustably mounted to the seating assembly and includes a leg rest clamping mechanism for clamping the leg rest at a fixed angular orientation relative to the frame. The leg rest may be rotated substantially 90 degrees in front of the wheelchair and substantially 90 degrees beneath the seat. The leg rest includes independently adjustable right and left foot rest plates to enable the length of each leg to be independently accommodated. Also, the foot rests independently rotate to enable independent adjustment of the ankle angle.

In another aspect of the modular wheelchair, the chassis is formed in two halves which are connected by single or multiple cross-members of a selectable length, or telescoping cross-members, thereby enabling the wheelchair to be custom designed to fit particular body dimensions. In this aspect, the cross-members of the seating assembly are telescoping thereby enabling the seating assembly to be adjusted to conform to the width of the chassis. In yet another aspect of the modular wheelchair, the side rails for adjustably attaching the seating assembly are mounted to the sides of the chassis.

In one more aspect of the present invention the foot plate of the leg rest assembly is elliptical for enabling the angle of the user's ankle to be adjusted, or a flat plate that can be rotated is used for providing independent ankle angle adjustment.

In another aspect of the present invention, the seating assembly is a sling back sports seating assembly.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 3 is a top plan view of the chassis of the present invention with the drive wheels attached and the foot rest plates shown in phantom for orientation in this view.

FIG. 4 is a somewhat diagrammatic side view in elevation and section of the FIG. 1 wheelchair showing the adjustable seat attachment of the chassis in greater detail.

FIG. **5*a* is a cross sectional, enlarged frontal view of the wheel attachment mechanism of the chassis and taken along the lines 5—5 in FIG. 4. FIG. 5*b* is an enlarged side view of the interior of the chassis wheel attachment mechanism. FIG. 5*c*** is an end view of a mounting plate having a keyway attachment mechanism.

FIGS. **6*a*–6*d* show a series of exchangeable drive wheel attachment plugs having different chamber angles for securing the wheel assembly to the drive wheel attachment mechanism of the chassis. FIG. 6*e*** a drive wheel and axle for attachment within the plugs.

FIG. 7 is a side view of a three-spoke wheel assembly incorporating the principles of the present invention and attached to the chassis.

FIG. 8 is a side view of a multiple-spoked wheel assembly showing another aspect of the present invention and attached to the chassis. The drive wheel is partially cut away to reveal an anti-tip wheel.

FIG. 9 is a front view in elevation of another aspect of a leg rest assembly attached to the wheelchair components of the present invention.

FIG. 10 is a somewhat diagrammatic side detail view in elevation and section of a hinging and latching mechanism for the seat back of the FIG. 1 seating system, with the seat back shown in its latched upright position relative to the seat.

FIG. 11 is a top plan detail view of one side of the FIG. 10 latching mechanism for releasably latching the seat back to the seat body.

FIG. 12 is a side view in elevation of the chassis and seating assembly of the wheelchair of FIG. 1 showing the telescoping posts for attachment of the seat assembly, and showing the chassis module and the seat assembly module detached for transporting or storage purposes.

FIG. 13 is a side view in elevation of the seating assembly module of the wheelchair of FIG. 1 showing the leg rest assembly folded beneath the seating assembly for transportation or storage purposes.

FIG. 18 is a somewhat diagrammatic view in side view and longitudinal section of a chassis of the present invention illustrating how a pair of rear anti-tip wheel assemblies may be attached to the chassis to inhibit rearward tipover of the wheelchair.

FIG. 19 is a highly diagrammatic top-plan view showing relative placement of one anti-tip wheel assembly relative to the placement of an adjacent main drive wheel.

FIG. 20 is a diagrammatic view of a travel wheel assembly in place of the anti-tip wheel assembly.

FIG. 21 is a highly diagrammatic top-plan view showing relative position of one travel wheel assembly relative to an adjacent main drive wheel.

DETAILED DESCRIPTION OF A PREFERRED EMBODIMENT

Figure 1:
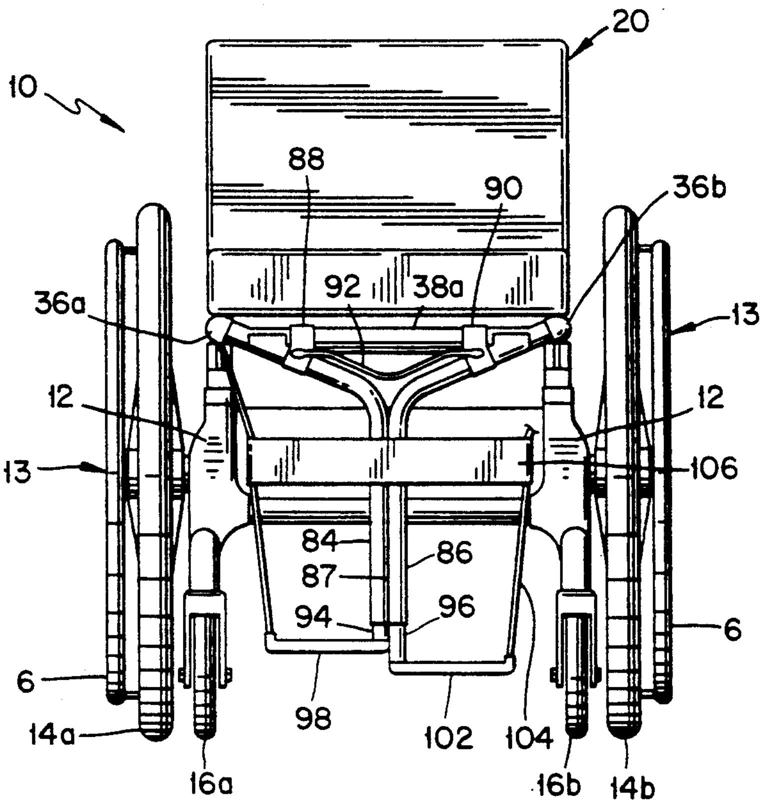
FIG. 1 is a front view in elevation of a modular wheelchair incorporating the principles of the present invention.
Figure 2:
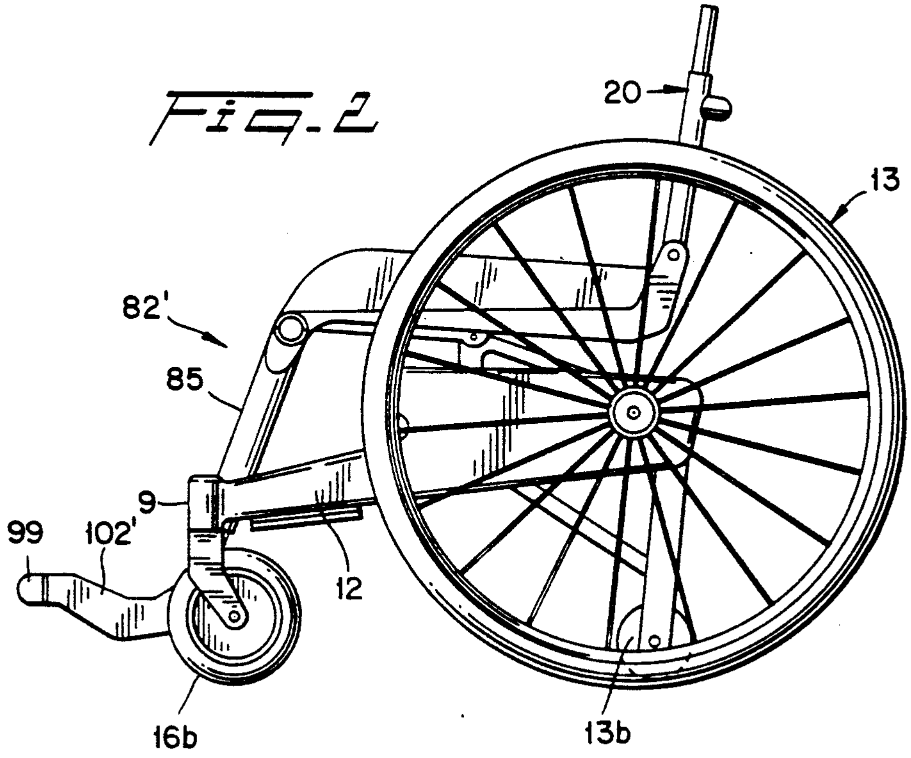
FIG. 2 is a somewhat diagrammatic side view in elevation of a wheelchair incorporating principles of the present invention showing another aspect of a leg rest assembly and an aspect of the wheel assembly.

Referring to FIGS. 1 and 2, a modular wheelchair embodying the principles of the present invention is shown generally at 10 and includes the following detachable, modular components: a chassis 12, a wheel assembly 13 attached to the chassis 12, a seating assembly 20 attached to the chassis 12, and a leg rest assembly 82 attached to the seating assembly 20.

The chassis 12 embodying principles of the present invention can be formed from a variety of composite materials by compression molding, injection molding, resin transfer molding, or by a number of other known molding techniques such as preform or knitting techniques. Composite materials may include carbon, glass, graphite, or aramid fibers (or combinations thereof), or preimpregnated cloth or unidirectional tape made from the same listed substances of combinations thereof. Polyester, vinyl, epoxy or other similar substances are used as resins and may be combined with the fibers, or injected in the case of resin tranfer molding. Fillers, such as glass beads or mineral varieties are typically included. The composite material may be tailored to preselected use specifications. Presently, it is preferred to construct the chassis by compression molding of sheet molding compound using a combination of E-glass and carbon short fiber and carbon or glass preimpregnated tape and/or cloth with a vinyl ester resin and glass bead filler. Continuous length fibers may be used locally. All surfaces are contoured to provide a rounded, smooth and streamlined appearance to the chassis 12.

Referring to FIGS. 2 and 3, the chassis 12 defines two hollow or foam filled , longitudinal side rails 17a and 17b connected by one or more hollow, knitted preform, foam filled, or formed metallic cross-bars 19. The anterior ends of side rails 17a and 17b define forwardly and downwardly extending, cantilevered or trussed arms 23a and 23b. Two swivel-mounted castors 16a and 16b are conventionally attached by snap-locks to the sleeves 9 of the arms 23a and 23b, and are thereby positioned anterior to the drive wheels 16a and 16b. The sleeve portion 9 of the arms 23 extend below the plane of the sides 17 and the composite material of the arms 23 provides vibration and shock absorbing functions for the wheelchair. The composite material of chassis 12 causes the flexible and resilient arms to yield slightly under a vertically directed impact. The arms 23 individually react to impact and may flex slightly to maintain the alignment of the upper frame portion of the chassis formed by the cross-bars 19 and the sides 17.

Figure 15:
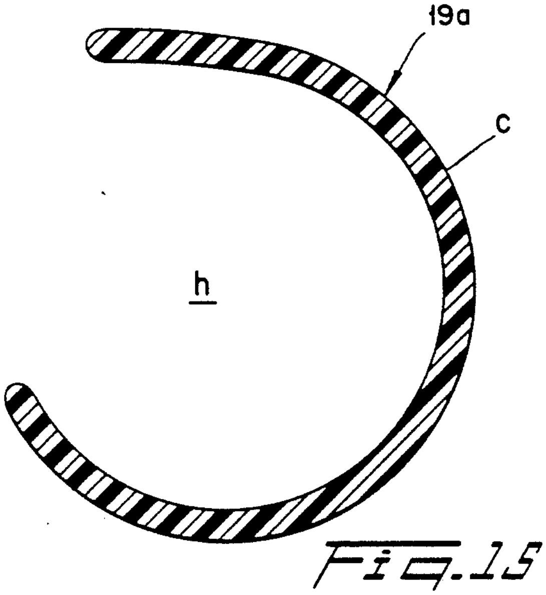
FIG. 15 is a sectional view taken along the lines 3-3 in FIG. 3 and showing the generally C-shaped hollow rear crossbar of the chassis.

Composite materials are known to be lightweight, strong, resilient, and moldable. The amount of resilience can be preselected during manufacture using techniques well established among those skilled in the art of composite materials. For example, the chassis may be formed from fiber-resin unidirectional tape of a selected fiber composition, alignment and density thereby preselecting the known shock absorbing properties of the composite material for a predetermined impact direction. The chassis sides 17 and cross-bars 19 are hollow or foam filled shells thereby creating a light-weight chassis enabling components, such as drive motors, to be stored within hollow shells. Referring to FIG. 15, a generally C-shaped rear cross-bar 19a is shown in cross section having a hollow composite shell "c" thereby defining an interior hollow space "h" which may be fitted with two drive motors (not shown) for independently driving the drive wheels 14.

The position of the arms 23 in relationship to the longitudinal sides 17 may be preselected to create an acute angle from approximately 5 degrees to 20 degrees. The acute angle makes it easier to closely approach the seat of the wheelchair; and, the acute angle creates a space underneath the chassis and seat. The space may be used for storage of articles or for wheelchair auxiliary equipment such as a power supply or other electronic components.

Referring to FIGS. 5 and 6, a longitudinal sectional view of a drive wheel attachment mechanism is shown generally at 27. The attachment mechanism 27, one for each longitudinal side 17, is a cylindrical recess 29 within side 17. The cylindrical recess 29 initiates at a notched bracket portion 35 of the outer surface of contoured side 17, and terminates at a moldedin plate 31, shown in FIG. 5b, bearing a pattern of holes 33. A mating pattern of holes (not shown) are included in a number of selectable wheel axle alignment plugs 90, shown in FIGS. 6a–6d, which are secured within the recess 29 for mounting the drive wheel axle 15. As shown in FIG. 5c, the plate 31 may include a keyway for attaching the plugs 90, in lieu of the pattern of holes. The alignment plugs 90 define axle chambers 91 having different angles to enable the camber angle of the drive wheels 14 to be selected for particular user activities. The drive wheel axle 15 is friction mounted within the cylindrical chamber 91 and may be secured within the chamber 91 by convention screws or snap-mount devices. The alignment plug 90 and the wheel mounting mechanism 27 together permit the camber of the drive wheels 14 to be easily adjusted without changing the wheelbase or the seat height.

Referring to FIGS. 2, 6*e*, 7 and 8, the wheel assembly 13 includes the drive wheels 14*a* and 14*b*, the travel wheels 13*a* and 13*b*, and the anti-tip wheels 2*a* and 2*b*. The smaller travel wheels 13 and the anti-tip wheels 2 may be mounted on the axle 15 between the drive wheel 14 and the alignment plug 90.

The drive wheels 14 are constructed from composite materials with and without metal rims and hubs, and include a conventional outer propulsion ring 6 for manually rotating the wheels by operation of the user's hands and arms. The drive wheels 14 may have three composite spokes, as shown in FIG. 7. The three spokes are sufficiently broad to prevent the user's clothing from becoming entangled in the spokes. In another aspect, approximately 5 composite spokes are provided; and, in FIG. 8, conventional wire spokes are shown. Alternatively, tensioned disk wheels may be used. The tensioned disk wheels may have cord lacings of nylon, Kevlar (tm), dacron or other materials having similar properties and including a variety of lacing patterns. The tensioned disk wheels are specially dished and laced to accommodate side loads created when the wheelchair user tips the wheelchair up onto one wheel. Tensioned wheels are light weight and corrosion resistant, and provide high tensile strength and elasticity to absorb vibrations. As shown in FIG. 6*e*, of the drive wheels have a wheel axle 15 which is secured within the wheel alignment plug 90 for mounting within the recess 27 in the chassis 12. The travel wheels and the anti-tip wheels are mounted over the axle of the drive wheels and used therewith, and the travel wheels are suspended above the ground until needed. To use the travel wheels to pass through a narrow opening, the user tips the chair up so that it rests upon one of the drive wheels, and then detaches the opposite drive wheel. The chair is then tipped down onto the exposed travel wheel and the other drive wheel is detached. The drive wheels 14 may be standard 24" pneumatic wheels, or may be any wheels functioning with a suitable sized axle. Presently, a ½" diameter steel or titanium axle is preferred.

Figure 17A:
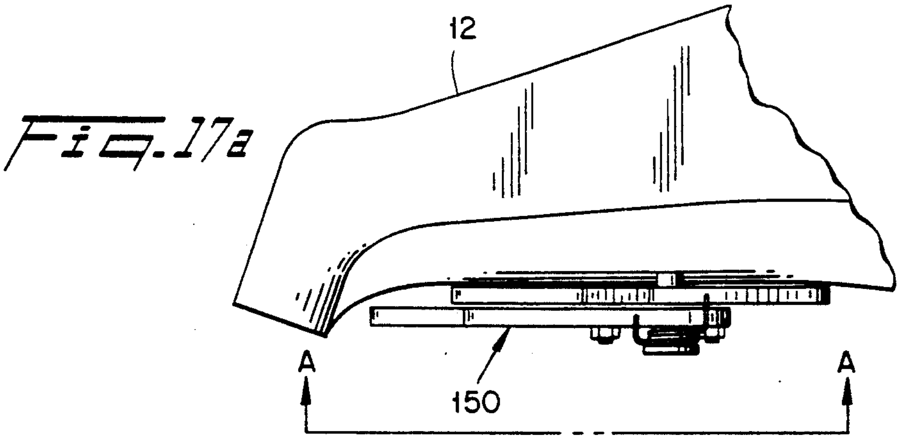
FIG. 17a is a side view of a chassis of the present invention showing a wheel lock attached thereto.
Figure 17B:
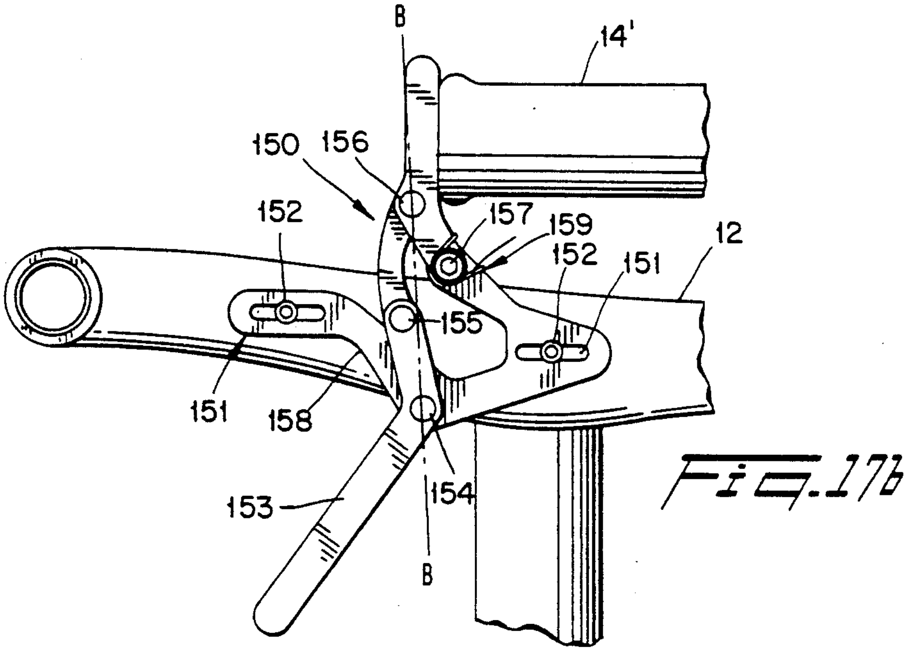
FIG. 17b is a top view taken along the line A—A of FIG. 17a showing the lock in the on position.
Figure 17C:
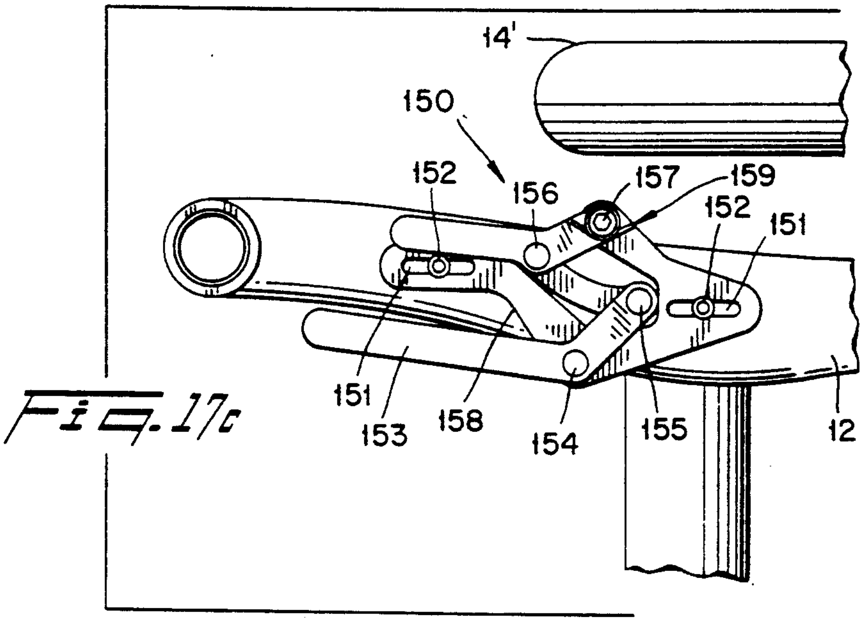
FIG. 17c is a top view taken along the line A—A of FIG. 17a showing lock in the off position.

Referring now to FIGS. 17*a*–17*c*, the wheel lock assembly of the present invention is shown generally at 150 and attached or molded into the underside of the chassis 12. The lock 150 is shown open and pressing up against the tire 14' in FIG. 17*b* and closed and retracted beneath the chassis 12 in FIG. 17*c*. The wheel lock 150 may be metallic or may be made from composite materials, and defines a bracket portion 155 having slots 151 for attachment of screws 152. The slots 151 permit the lock 150 to be moved forward and backward on the chassis 12 to accommodate tires having a variety of diameters. The wheel lock 150 defines an actuation lever 153 mounted to the bracket 158 by pivotable fasteners 154–157, such as screws, brads, rivets or other suitable pivotable fastening devices. As best seen in FIG. 17*c*, the actuation lever 153 is formed of two portions pivotally connected by fastener 155, and the bracket 158 is formed by two portions pivotally connected by fastener 157. The configuration of the two-piece lever 153 and the two-piece bracket 158 creates a wheel lock 150 wherein the lever 153 is moved in a counterclockwise direction to open or close the wheel lock. A torsion spring 159 causes the lock to automatically move fully to the off position, FIG. 17*c*, as the actuation lever 153 is moved counterclockwise past the midline as shown in line B—B. Conversely, the torsion spring 159 causes the lock to automatically move towards the lock position as the actuation lever 153 is again moved counterclockwise just past the midline to close the lock. The torsion spring 159 biases the lock in an open and closed position and is activated to return the lock toward either position by an approximately 5 degree movement from the midline. The wheel lock is retracted in its biased position under the chassis when not in use so that shocks will not cause the lock to move toward the tire thereby preventing the user's thumbs from being caught and injured during rotation of the drive wheels.

Referring to FIGS. 1 and 4, the seating assembly module includes a generally rectangular frame 34 formed of two longitudinal side extrusions 36*a* and 36*b*, and one or more cross-members 38*a* and 38*b* respectively secured to the side extrusions at the front and rear of the frame 34. Two longitudinal mounting rails 40*a* and 40*b* extend downwardly from the side extrusions 36*a* and 36*b*. The rails 40*a* and 40*b* are preferably integrally formed with the side extrusions 36*a* and 36*b*, although the rails may be made separately and then secured, e.g. by welding, to the undersides of the side extrusions 36*a* and 36*b*. The rails 40*a* and 40*b* include a plurality of holes 42.

Referring to FIGS. 1, 3 and 4, the seating system 20 is demountably attached to the chassis 12 by four mounting posts: two rear posts 22*a* and 22*b* and two forward posts 24*a* and 24*b* which telescope upwardly from within the molded chassis structure 12. The rear posts 22*a* and 22*b* adjustably telescope along an upward locus within the two rear tubes 26*a* and 26*b* within the chassis 12, while the forward posts 24*a* and 24*b* telescope within two forward tubes 28*a* and 28*b* as shown in FIGS. 3 and 4. The four tubes 26*a*, 26*b*, 28*a*, and 28*b* each define an upper, annular neck portion 25.

The rear posts 22*a* and 22*b* may be set at progressively stepped heights by virtue of holes 30 and a transverse locking pin passing through a selected hole through the post 22 and a transversely aligned hole pair defined through the corresponding tube 26. The front posts 28*a* and 28*b* telescope throughout a continuous range. A pair of compression clamping mechanisms 32*a* and 32*b* compress the corresponding annular neck portion 25 of the tubes 28*a* and 28*b* about the corresponding posts 24*a* and 24*b* to lock the posts 24 at the desired height. A levered release nut (not shown) enables the clamping mechanism 32 to be released and the post 28 to be adjusted without any external tools. In this manner, the height of the seating system 20 relative to the drive wheels 14*a* and 14*b* may be easily and readily established, in order to provide an adjustment of the seat height relative to the chassis 12 to take into account the length of the user's arms. This is important in order to provide a comfortable, effective driving relationship between the user's hands and arms and the drive wheels 14, so that the user may efficiently provide the motive force to drive the drive wheels 14*a* and 14*b* and thereby propel the wheelchair 10. It will be understood by those skilled in the art that the selected height of the rear posts 22 may be secured by a compression clamping mechanism 32, that the selected height of the front posts 28 may be secured by locking pins, or that clamping mechanisms or locking pins may be used for both the rear posts 22 and the front posts 28.

The angle of the seating system 20 relative to the chassis 12 (and to the generally horizontal surface over which the wheelchair 10 is propelled) may also easily be adjusted by height adjustment of the forward posts 24 relative to the rear posts 22.

The rail 40*a* is adjustably attached to the mounting posts 22*a* and 24*a*, and the rail 40*b* is adjustably attached to the mounting posts 22*b* and 24*b*. While there may be a virtually unlimited number of longitudinal attachment positions of the seating system 20 by the rails 40, five positions are shown in FIG. 4 by virtue of transverse holes 42 defined through the rails 40*a* and 40*b*. Each mounting post 22 and 24 includes a generally U-shaped mount 44, and a releasable locking pin 46 passes through the U-shaped mount 44 and into a selected mating hole 42 on the seating system 20. A locking nut (not shown) may be used with the locking pin 42, or the locking pin 42 may be self-contained with an expansion collet or projection end. (Such self locking pins are in common, widespread use in rigging of sailboats.) In this manner, the center of gravity of the user may be adjusted relative to the chassis 12 and its fixed wheelbase between the drive wheels 14 and the castors.

Referring to FIGS. 3, 10 and 11, the seating system 20 further includes a back rest 50 which adjustably telescopes up and down to adjust to the user. The back rest 50 preferably includes a horizontal push bar 52 which enables an attendant or other caring person to push or pull the wheelchair 10 with or without the user seated therein in a desired direction of travel.

The back rest 50 is hinged to the frame 34 at a pivot location 54 by two hinge plates 56*a* and 56*b* which are respectively joined to two side tubes 58*a* and 58*b*. A back rest frame 60 includes side legs which enables the back rest 50 to telescope up and down relative to the seat frame 34. Adjustment holes 62 through the side tubes 58*a* and 58*b* enable a locking pin to fix the height of the back rest 50 to the desired position. The back rest 50 includes a webbed or non-webbed fabric material 61 effectively secured to the back rest frame 60 in order to provide a comfortable back rest function to the user when seated in the wheelchair 10. The fabric material 61 may or may not include padding for added comfort of the user.

Turning now to FIGS. 10 and 11, an angle adjustment mechanism for the back rest 50 will be described. While the back rest 50 is adapted to pivot relative to the seat frame 34 at the pivot point 54, the back rest 50 is normally locked in an upright position by virtue of a spring-loaded latching mechanism 64, as shown in FIG. 10. The latching mechanism 64 includes a flanged and threaded stud 66 which threads into the side tube 58, and a forked locking block 68 which is loaded by a spring 70. The locking block 68 an loading spring 70 are located within the side extrusion 36. A flange 72 of the stud 66 is sized to be wider than a slot 74 of the locking block 68. An inclined ramp surface 76 of the locking block 68 is contacted by the flange 72 as the back rest 50 is moved to an upright position. The ramp surface 76 causes the locking block 68 to move forwardly and deflect the loading spring 70 until a position is reached, shown in FIG. 10 where the flange 72 has passed beyond the locking block 68, at which point the locking block 68 snaps back to lock over the flange 72 and thereby hold the stud 66 and the back rest 50 in upright position.

As best seen in FIG. 11 a release bar 78 enables the locking block 68 to be moved against the spring 70 until it clears the flange 72. Upon release of the latching mechanism 64, the back rest 50 may be pivoted forward, either for adjustment of back rest angle which is made by threading the stud 66 into or out of the tube 58 with a suitable tool (not shown) or to a fully folded position, as shown in FIGS. 12 and 13.

Referring to FIGS. 1 and 4, the modular leg rest assembly 82 is pivotally mounted to the front cross-bar 38*a* of the seating system frame 34. The leg rest assembly 82 includes two tubes 84 and 86 which are connected along a common seam 87. One or more compression clamps 88 and 90 respectively attach the tubes 84 and 86 to the cross-bar 38*a*. The compression clamps 88 and 90 are compressed and released by operation of a common actuation lever 92. Rotation of the lever 92 causes the clamps 88 and 90 to lock the leg rest assembly 82 at a desired position relative to the seating system 20 and the wheelchair 10 on which the seating system is installed and to be used.

Two footrest shafts 94 and 96 coaxially telescope along an upward locus within the tubes 84 and 86 respectively. As will be recognized by those skilled in the art, a single tube having two interior races may be used to accommodate the telescoping shafts 94 and 96, as shown in FIG. 9. The footrest shafts 94 and 96 may be set independently at progressively stepped heights by virtue of transverse locking pins (not shown) passing through a selected opening through the corresponding tubes 84 and 85. Alternatively, the tube position for the selected height may be set with a conventional clamp such as a ring clamp.

A right laterally extending footrest 98 is secured at an inner end of the tube 94 and is thereby positioned by adjustable extension of the tube 94. An outer support rod 100 attaches between a lateral end of the right footrest 98 and a right side extrusion 36*a* of the seating system (shown on the left side of the front elevation drawing of FIG. 1) and also permits height adjustments to be made to the right footrest 98. A left footrest 102 is secured to an inner end of the tube 96 and is also thereby positioned by adjustable extension of the tube 96 relative to the tube 86. A lateral support rod 104 attaches between an outer end of the left footrest 102 and the left side extrusion 36*b* of the frame 34. The outer rod 104 also permits height adjustments to be made to the left footrest 102 which are independent of the height adjustments made to the right footrest 98, as suggested by differing footrest heights shown in FIG. 1. The outer rods are constructed of an elastic material and are maintained under tension to provide axial alignment support to the outer ends of the footrests. Alternatively, the outer rods may be a rigid material, such as a rigid metal rod, or the outer rods may be telescoping tubes maintained under tension with a spring or elastic cord. A leg support sling 106, formed of a suitable webbed or nonwoven fabric material is loosely and adjustably suspended across the outer support rods 100 and 104 to enable the user's calves to be conveniently and comfortably supported.

The angle of the entire leg rest assembly 82 may be easily adjusted by partially releasing the clamps 88 and 90 with the clamping control lever 92 and thereupon rotating the leg rest assembly 82 relative to the frame 34. The footrest may be incrementally rotated relative to the frame 34 throughout an approximately 180 degree range of motion to fully extend the user's legs and knee joints, or to position the leg rest assembly 82 beneath the seat of the wheelchair, as shown in FIG. 13, to store the wheelchair or to facilitate entry and exit from the wheelchair. The pivot attachment of the leg rest assembly 82 enables a therapeutically determined knee angle for the user to be preselected and maintained. When the desired angle is reached, the clamping control lever 92 is manipulated simultaneously to tighten the clamps 88 and 90.

Figure 16A:
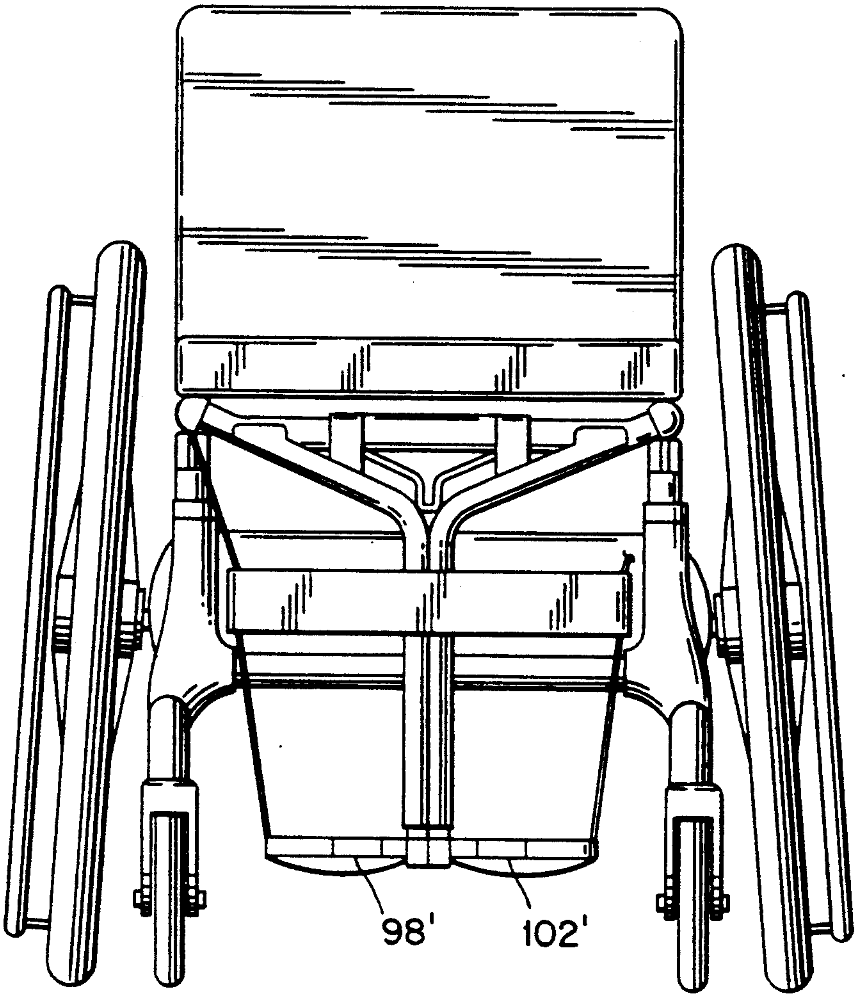
FIG. 16a is a front view in elevation of a wheelchair incorporating a leg rest assembly having pivotal foot rests for adjusting the user's ankle angle.
Figure 16B:
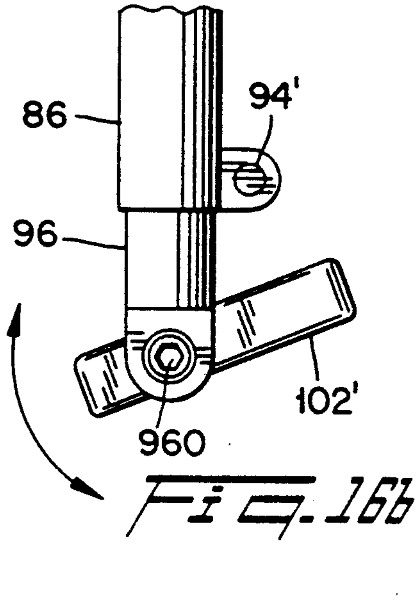
FIG. 16b is an enlarged side view of the pivot mechanism of the foot-rest.

As shown in FIGS. 16a and 16b, the footrests may be pivotally attached to the tubes 94 and 96 by locking nuts 960 thereby enabling the footrest angle to be adjusted to accommodate changes in the knee angle according to the user's preference. Either footrest 98 or 102, may be removed from its corresponding outer tube 84 or 86 by removal of the inner tube 94 or 96 and disconnection of the support rod 100 or 104, as the case may be for an amputee. For double amputees, the entire leg rest assembly 82 may be removed from the seating system frame 34 upon full release of the clamps 88 and 90 and removal of the tubes 84 and 86. This arrangement enables the entire seating system 20 including the seat frame 34, back rest 50 and leg rest 82 to be nested together for storage or convenient transportation as in the overhead luggage compartment of an airplane.

In another aspect of the leg rest assembly 82 shown in FIGS. 2 and 9, a single vertical tube 85 is pivotally mounted to the front cross-bar 38a of the seating system. Compression clamps attach the single, extensible tube 85 to the cross-bar 38a, as described above. A single footrest shaft 95 is secured at an inner end of the tube 85 and is positioned by extending the tube 85. The transversely aligned footrest 102' defines forwardly positioned protrusions which terminate in bumper knobs 99. The knobs 99 may be formed from rubberized materials which protect the feet and which enable the user to push against doors or other objects. The footrest 102' is elliptically shaped to enable the user's feet to be positioned to select a therapeutic ankle angle. The range of ankle positions may thereby be adjusted in conjunction with a selected knee angle selected by adjusting the compression clamps.

With reference to FIGS. 18 and 19, an arrangement is depicted for the addition of modular anti-tip wheel assemblies 150, there being a left anti-tip wheel assembly 150a associated with the left wheel 14a and a right anti-tip wheel assembly 150b associated with the right wheel 14b. Within the chassis module 17 is formed a substantially vertical, reinforced well 151 which is opened at the lower face of the chassis and which has an end plug or wall 152 which establishes the depth of the well 151 within the chassis. Into this well 151 may be placed a vertical arm 154 of an anti-tip wheel assembly 150. The arm 154 is keyed rotationally, so that it does not rotate relative to the chassis when installed. A button spring 156 may be used to key the arm 154 and prevent relative rotation thereof.

The arm 154 secures and positions an angled support leg 158 which in turn supports a small caster 160. The caster 160 extends rearwardly of the chassis 17 and just inside of the rearwardmost locus of the drive wheel 14. Also, the caster 160 is positioned above the riding surface slightly, so that normally it is not in contact therewith. In the event of a rollback of the wheelchair, the snall caster 160 comes into contact with the riding surface or floor and prevents tip-over.

FIGS. 20 and 21 illustrate a travel wheel accessory for the wheelchair. A travel wheel assembly 170 including a vertical arm 172 and a slightly angled leg 174 support and journal a travel wheel 176 which is normally positioned to be just above the travel surface or floor. As with the anti-tip wheel assemblies 150a and 150b, there are two travel wheel assemblies 170a and 170b, one for each main drive wheel.

As seen in FIG. 21, the travel wheel is arranged so as to be approximately at the same wheelbase as is provided by the main drive wheel 14. However, the travel wheel 176 is much smaller than the drive wheel, and it is located inside of the vertical plan footprint of the chassis, so that the user may use the wheelchair to go through narrow aisles, such as are found in airplanes, etc.

When it is expected that the travel wheel assemblies 170 will be needed, they are snap locked into place ahead of time, again with a suitable spring loaded snap pin 156, or equivalent locking device. Then, when the main drive wheels are to be removed, the user rocks the chair to one side, so that one drive wheel is lifted off of the riding surface. That wheel is then demounted. Next, the chair is rocked to the other side and now rests on the travel wheel of the side from which the main drive wheel has been removed. At this point the other main drive wheel may be removed and the wheel chair returned to a normal position in which it rests solely upon the front casters and the travel wheels 176

Figure 22:
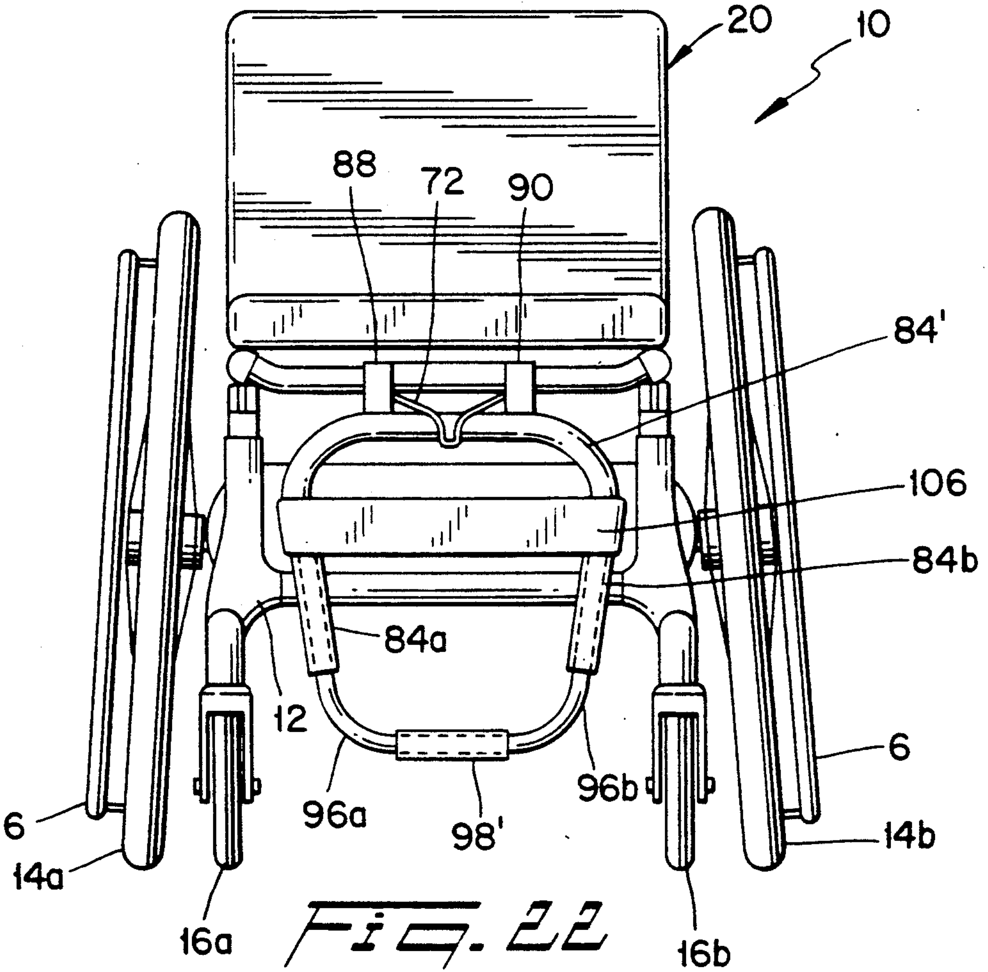
FIG. 22 is a view in front elevation of a modular wheelchair including a modified leg rest assembly in accordance with the principles of the present invention.

In still another aspect of the leg rest assembly shown in FIG. 22, a single shaped tube 84', generally in an inverted U shape, provides an attachment to telescoping legs 96a and 96b of an adjustable footrest tube 96'. The two telescoping legs 96a and 96b may be adjustably moved upwardly and downwardly within portions 84a and 84b of the U-shaped tube 84'. Since the portions 8raand 84b are angled inwardly, as the legs 96a and 96b adjustably telescope within portions 84a and 84b, lateral portions of the legs 96a and 96b simultaneously telescope within a foot support structure 98'. The generally U-shaped single tube 84' is particularly suitable for protection against impact from the side during sports events, and it provides a convenient handle or grip to enable the user to pull himself or herself from the floor and back into the wheelchair.

In yet another aspect of the present invention, the chassis 12 is formed into two hollow or foam filled halves that are connected by telescoping crossbars 19a and 19b that are secured to the longitudinal sides 17a and 17b to form a unitary chassis 12. The telescoping bars permit the user to adjust the width of the chassis. In this aspect, the cross bars of the seating system are also of adjustable width. Alternatively, the crossbars may be of a pre-selected length to permit the wheelchair to be of a custom size for a particular user's needs.

Figure 14:
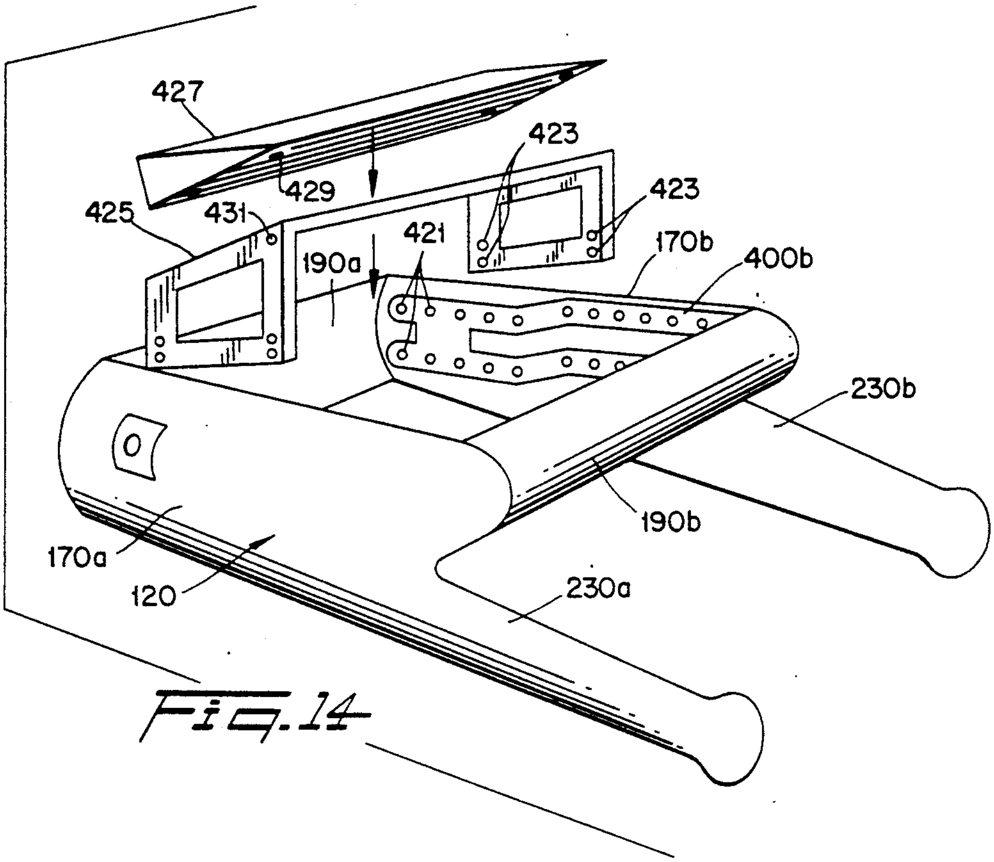
FIG. 14 is a perspective view in elevation of an aspect of the present invention wherein mounting rails are attached to the chassis to mount the seating assembly.

In yet another aspect of the present invention shown in FIG. 14, the mounting rails 400a and 400b for the seat assembly are molded as plates in the inside surface of the longitudinal side rails 170a and 170b of the chassis 120. The metallic plates 400 are bonded into the chassis 120 during its construction, or may be attached by rivets. A multitude of holes 421 are included to align with mating holes 421 in a seat bracket 425. The seat bracket 425 is secured to the rails 400 using quick release pins, or alternatively by conventional pins or bolts. As can be seen in FIG. 14, the seat bracket 425 and the rails 400 include holes 423 and 421, respectively, at differing heights thereby enabling the seat height to be adjusted. The plurality of longitudinally extending rail holes 421 additionally enables the lateral position of the seat to be adjusted thereby adjusting the center of gravity of the chair. The forwardly extending arms 230a and 230b form a preselectable acute angle with the longitudinal sides 170. In this embodiment, seating placement may also be adjusted by a seat shim 427. Bolt holes 429 are included for mounting to mating bolt holes 431 on the seat bracket 425. The seat shim 427 is exchangeable with other shims (not shown) thereby allowing shim angles to be selected from 0 to 12 degrees.

Although the presently preferred embodiment of the invention has been illustrated and discussed herein, it is contemplated that various changes and modifications will be immediately apparent to those skilled in the art after reading the foregoing description in conjunction with the drawings. For instance, the specifications of the molded chassis may be preselected to mount a variety of seating assemblies, with or without leg rest assemblies, thereby enabling the user to participate in activities such as sports, or to use the wheelchair in the shower. The wheel alignment plugs permit most desired wheel systems to be easily mounted to the universal chassis. Accordingly, it is intended that the description herein is by way of illustration and should not be deemed limiting the invention, the scope of which being more particularly specified and pointed out by the following claims.

What is claimed is:

1. A wheelchair comprising:

an adjustable chassis frame having two longitudinal sides connected by at least one adjustable bridge member, each side including an arm means for attaching a swivel mounted caster, each longitudinal side also including means for connecting a wheel mount and means for connecting a seating system mount;

a device wheel system having two drive wheel assemblies, each one of which includes an axle and a drive wheel, said axle being attachable to and removable from said wheel mount;

said wheel mount including at least one substantially identical pair of camber adjustment plugs, said pair of plugs each having a bushing for releasably attaching one of said axles to one of said drive wheels at a selected angle such that said drive wheel is attached to said chassis frame at a selected camber angle without varying the chassis height;

a wheel lock including a means for actuating a locking lever between an on and off position wherein said lever is positioned beneath one of said two longitudinal sides of said chassis frame in said off position and wherein said lever is in contact with said drive wheel when in said on position, said wheel lock being adjustably mounted to said chassis frame;

a seating system module including a seat frame adjustably and removably mountable to said seating system mount, said seat frame having two seat side members and a seat removably mounted to said set frame for seating a user;

said seating system mount including at least four telescoping members, at least two of which being extendable vertically from each of said longitudinal sides of said chassis frame and being securable at a desired position relative to said seating system module, said telescoping members providing for height adjustment of said seating system module relative to said chassis frame and providing for adjustment of an angle of attachment of said seating system module relative to said chassis module;

said backrest including a backrest frame, said backrest frame including backrest means for angularly adjusting said backrest frame relative to said seat frame, said backrest means further including a push bar means for enabling said wheelchair to be pushed by an attendant, said backrest means further including a backrest telescoping means for enabling telescoping of said backrest frame, said backrest means being pivotable about a backrest pivot point on said seat frame on a backrest pivot means;

means for locking said backrest including at least one spring loaded, releasable latch disposed within said seat frame;

said backrest telescoping means including at least two side backrest legs and at least two side backrest tubes, said backrest legs capable of being telescoped and locked in position within a corresponding one of said at least two side backrest tubes;

a leg rest module including a leg rest assembly and a leg rest mount for removably and pivotally mounting said leg rest assembly to said seat frame;

said leg rest assembly having a leg support bar, one end of said leg support bar being pivotally and removably attached to said seat frame by said leg rest mount;

said leg rest mount having a locking lever for securing said leg rest in a selected position relative to said frame, said leg rest mount being adjustable around substantially 180 degrees relative to said seat frame, said leg rest assembly being adjustable such that said leg rest assembly can be axially aligned anterior to said seat frame and be axially aligned beneath said seat frame; and a foot support mount having at least one telescoping tube adjustably and removably mounted to an opposite end of said leg support bar, a foot plate for mounting said foot plate to said foot support mount and for permitting said foot plate to pivot relative to said foot support mount.

2. A wheelchair comprising:

an adjustable chassis frame having two longitudinal sides connected by at least one adjustable bridge member, each side including an arm means for attaching a swivel mounted caster, each longitudinal side also including means for connecting a wheel mount and means for connecting a seating system mount;

a drive wheel system having two drive wheel assemblies, each one of which includes an axle and a drive wheel, said axle being attachable to and removably from said wheel mount;

said wheel mount including at least one substantially identical pair of camber adjustment plugs, said pair of plugs each having a bushing for releasably attaching one of said axles to one of said drive wheel at a selected angle such that said drive wheel is attached to said chassis frame at a selected camber angle without varying the chassis height;

left and right travel wheel assemblies, said travel wheel assemblies being positioned with respect to said frame so as to have substantially the same wheel bas as said drive wheel assemblies, said travel wheel assemblies being disposed between said two drive wheels, said travel wheel assemblies having a normal position which is spaced above a travel surface;

a wheel lock including a means for actuating a locking lever between an on and off position wherein said lever is positioned beneath on of said two longitudinal sides of said chassis frame in said off position and wherein said lever is in contact with said drive wheel when in said on position, said wheel lock being adjustably mounted to said chassis frame;

a seating system module including a seat frame adjustably and removably mountable to said seating system mount, said seat frame having two seat side members and a seat removably mounted to said seat frame for seating a user;

said seating system mount including at least four telescoping members, at least two of which being extendable vertically from each of said longitudinal sides of said chassis frame and being securably at a desired position relative to said seating system module, said telescoping members providing for height adjustment of said seating system module relative to said chassis frame and providing for adjustment of an angle of attachment of said seating system module relative to said chassis module;

said backrest including a backrest frame, said backrest frame including backrest means for angularly adjusting said backrest frame relative to said seat frame, said backrest means further including a push bar means for enabling said wheelchair to be pushed by an attendant, said backrest means further including a backrest telescoping means for enabling telescoping of said backrest frame, said backrest means being pivotable about a backrest pivot point on said seat frame on a backrest pivot means;

means for locking said backrest including at least one spring loaded, releasable latch means disposed within said seat frame;

said backrest telescoping means including at least two side backrest legs and at least two side backrest tubes, said backrest legs capable of being telescoped and locked in position within a corresponding one of said at least two side backrest tubes;

a leg rest module including a leg rest assembly and a leg rest mount for removably and pivotally mounting said leg rest assembly to said seat frame;

said leg rest assembly having a leg support bar, one end of said leg support bar being pivotally and removably attached to said seat frame by said leg rest mount;

said leg rest mount having a locking lever for securing said leg rest in a selected position relative to said frame, said leg rest mount being adjustable around substantially 180 degrees relative to said seat frame, said leg rest assembly being adjustable such that said leg rest assembly can be axially aligned anterior to said seat frame and be axially aligned beneath said seat frame;

a foot support mount having at least one telescoping tube adjustably and removably mounted to an opposite end of said leg support bar, for mounting a foot plate to said foot support mount and for permitting said foot plate to pivot relative to said foot support mount.

3. A wheelchair comprising:

an adjustable chassis frame having two longitudinal sides connected by at least one adjustable bridge member, each side including an arm means for attaching a swivel mounted caster, each longitudinal side also including means for connecting a wheel mount and means for connecting a seating system mount;

a drive wheel system having two drive wheel assemblies, each one of which includes an axle and a drive wheel, said axle being attachable to and removably from said wheel mount;

said wheel mount including at least one substantially identical pair of camber adjustment plugs, said pair of plugs each having a bushing for releasably attaching one of said axles to one of said drive wheel at a selected angle such that said drive wheel is attached to said chassis frame at a selected camber angle without varying the chassis height;

left and right anti-tip wheel assemblies, said anti-tip wheel assemblies extending rearwardly of said chassis frame, anti-tip wheel assemblies being mounted so as to be disposed between said two drive wheels, said anti-tip wheel assembly means being normally positioned to be spaced above the travel surface;

a wheel lock including a means for actuating a locking lever between an on and off position wherein said lever is positioned beneath on of said tow longitudinal sides of said chassis frame in said off position and wherein said lever is in contact with said drive wheel when in said on position, said wheel lock being adjustably mounted to said chassis frame;

a seating system module including a seat frame adjustably and removably mountable to said seating system mount, said seat frame having two seat side members and adjustable cross-brace member, a seat removably mounted to said seat frame for seating a user;

said seating system mount including at least four telescoping members, at least two of which being extendable vertically from each of said longitudinal sides of said chassis frame and being securable at a desired position relative to said seating system module, said telescoping members providing for height adjustment of said seating system module relative to said chassis frame and providing for adjustment of an angle of attachment of said seating system module relative to said chassis module;

said backrest including a backrest frame, said backrest frame including backrest means for angularly adjusting said backrest frame relative to said set frame, said backrest means further including a push bar means for enabling said wheelchair to be pushed by an attendant, said backrest means further including a backrest telescoping means for enabling telescoping of said backrest frame, said backrest means being pivotably about a backrest pivot point on said seat frame on a backrest pivot means;

means for locking said backrest including at least one spring loaded, releasable latch means disposed within said seat frame;

said backrest means including at least two side backrest legs and at least two side backrest tubes, said backrest legs capable of being telescoped and locked in position within a corresponding one of said at least two side backrest tubes;

a leg rest module including a leg rest assembly and a leg rest mount for removably and pivotally mounting said leg rest assembly to said seat frame;

said leg rest assembly having a leg support bar, one end of said leg support bar being pivotally and removably attached to said seat frame by said leg rest mount;

said leg rest mount having a locking lever for securing said leg rest in a selected position relative to said frame, said leg rest mount being adjustable around substantially 180 degrees relative to said seat frame, said leg rest assembly being adjustable such that said leg rest assembly can be axially aligned anterior to said seat frame and be axially aligned beneath said seat frame;

a foot support mount having at least one telescoping tube adjustably and removably mounted to an opposite end of said leg support bar, a foot plate for mounting a foot plate to said foot support mount and for permitting said foot plate to pivot relative to said foot support mount.

4. A wheel chair as in claim 2, wherein said axles and said travel wheel assemblies are attachable to and removable from said wheel mount.

5. A wheelchair as in claim 2, wherein said travel wheel assemblies are attachable to and removable from said chassis frame.

6. A wheelchair as in claim 3, wherein said axles and said anti-tip wheel assemblies are attachable to and removable from said wheel mount.

7. A wheelchair as in claim 3, wherein said anti-tip wheel assemblies are attachable to and removable from said chassis frame.

8. A wheelchair as in claim 1, wherein said chassis frame longitudinal sides and said seat frame side members are formed as extrusions of composite materials.

9. A wheelchair as in claim 1, wherein said arm means for each longitudinal side of said chassis frame is angled outwardly from it corresponding longitudinal side such that a space between each of said arm means is larger than a space between a remaining portion of each longitudinal side.

10. A wheelchair as in claim 1, wherein the bushing of each of said camber adjustment plugs is oriented at a preselected angle within said plugs.

11. A wheelchair as in claim 1, wherein said means for locking said backrest includes a threaded member adjustably inserted into at least one of said two side backrest tubes and whereby said spring loaded, releasable latch means includes a slot for receiving and securing said threaded member when said back rest frame is pivoted to an upright position.

* * * * *